United States Patent
Cok et al.

(10) Patent No.: US 10,150,326 B2
(45) Date of Patent: Dec. 11, 2018

(54) HYBRID DOCUMENT WITH VARIABLE STATE

(71) Applicant: X-Celeprint Limited, Cork (IE)

(72) Inventors: Ronald S. Cok, Rochester, NY (US); Robert R. Rotzoll, Colorado Springs, CO (US); Christopher Bower, Raleigh, NC (US); Mark Willner, Denver, CO (US)

(73) Assignee: X-Celeprint Limited, Cork (IE)

( * ) Notice: Subject to any disclaimer, the term of this patent is extended or adjusted under 35 U.S.C. 154(b) by 0 days.

(21) Appl. No.: 15/593,126

(22) Filed: May 11, 2017

(65) Prior Publication Data
US 2017/0313119 A1 Nov. 2, 2017

Related U.S. Application Data

(63) Continuation-in-part of application No. 15/433,119, filed on Feb. 15, 2017.
(Continued)

(51) Int. Cl.
*B42D 25/305* (2014.01)
*G07D 11/00* (2006.01)
(Continued)

(52) U.S. Cl.
CPC ............ *B42D 25/305* (2014.10); *B42D 25/29* (2014.10); *B42D 25/30* (2014.10); *B42D 25/485* (2014.10);
(Continued)

(58) Field of Classification Search
CPC ............... B42D 25/29; B42D 2033/46; B42D 2033/26; B42D 25/30; B42D 25/305; B42D 25/485
See application file for complete search history.

(56) References Cited

U.S. PATENT DOCUMENTS

| 5,394,969 A | 3/1995 | Harbaugh |
| 5,550,066 A | 8/1996 | Tang et al. |

(Continued)

FOREIGN PATENT DOCUMENTS

| DE | 102013102003 A1 | 8/2014 |
| EP | 1 560 718 B1 | 3/2007 |

(Continued)

OTHER PUBLICATIONS

International Search Report, PCT/EP2017/054537, 4 pages, dated Jun. 30, 2017.

(Continued)

*Primary Examiner* — Shin H Kim
(74) *Attorney, Agent, or Firm* — William R. Haulbrook; Michael D. Schmitt; Choate, Hall & Stewart LLP

(57) ABSTRACT

A hybrid document includes a document having visible markings, one or more light-controlling elements embedded in or on the document, and a controller including a circuit having a non-volatile memory. The controller is embedded in or on the document and electrically connected to the one or more light-controlling elements for controlling the one or more light-controlling elements. A power input connection is electrically connected to any one or all of the controller, the circuit, the memory, or the one or more light-emitting elements. The memory stores a state and the circuit causes the one or more light-controlling elements to indicate the state. A hybrid document validation machine is adapted to accept one or more of the hybrid documents, change the state of the hybrid documents, and optionally display the state on a display.

12 Claims, 13 Drawing Sheets

Related U.S. Application Data

(60) Provisional application No. 62/301,211, filed on Feb. 29, 2016.

(51) Int. Cl.
  *B42D 25/29* (2014.01)
  *G07D 7/00* (2016.01)
  *G06K 19/18* (2006.01)
  *B42D 25/30* (2014.01)
  *B42D 25/485* (2014.01)

(52) U.S. Cl.
  CPC ............. *G06K 19/18* (2013.01); *G07D 7/003* (2017.05); *G07D 11/0021* (2013.01); *G07D 11/0054* (2013.01); *G07D 11/0066* (2013.01)

(56) References Cited

U.S. PATENT DOCUMENTS

| | | |
|---|---|---|
| 5,621,555 A | 4/1997 | Park |
| 5,815,303 A | 9/1998 | Berlin |
| 5,994,722 A | 11/1999 | Averbeck et al. |
| 6,084,579 A | 7/2000 | Hirano |
| 6,131,718 A | 10/2000 | Witschorik |
| 6,169,294 B1 | 1/2001 | Biing-Jye et al. |
| 6,184,477 B1 | 2/2001 | Tanahashi |
| 6,278,242 B1 | 8/2001 | Cok et al. |
| 6,392,340 B2 | 5/2002 | Yoneda et al. |
| 6,466,281 B1 | 10/2002 | Huang et al. |
| 6,577,367 B2 | 6/2003 | Kim |
| 6,659,351 B1 | 12/2003 | Bailleu et al. |
| 6,660,457 B1 | 12/2003 | Imai et al. |
| 6,703,780 B2 | 3/2004 | Shiang et al. |
| 6,717,560 B2 | 4/2004 | Cok et al. |
| 6,756,576 B1 | 6/2004 | McElroy et al. |
| 6,812,637 B2 | 11/2004 | Cok et al. |
| 6,828,724 B2 | 12/2004 | Burroughes |
| 6,933,532 B2 | 8/2005 | Arnold et al. |
| 7,012,382 B2 | 3/2006 | Cheang et al. |
| 7,091,523 B2 | 8/2006 | Cok et al. |
| 7,098,589 B2 | 8/2006 | Erchak et al. |
| 7,129,457 B2 | 10/2006 | McElroy et al. |
| 7,195,733 B2 | 3/2007 | Rogers et al. |
| 7,288,753 B2 | 10/2007 | Cok |
| 7,402,951 B2 | 7/2008 | Cok |
| 7,420,221 B2 | 9/2008 | Nagai |
| 7,466,075 B2 | 12/2008 | Cok et al. |
| 7,521,292 B2 | 4/2009 | Rogers et al. |
| 7,557,367 B2 | 7/2009 | Rogers et al. |
| 7,586,497 B2 | 9/2009 | Boroson et al. |
| 7,622,367 B1 | 11/2009 | Nuzzo et al. |
| 7,662,545 B2 | 2/2010 | Nuzzo et al. |
| 7,687,812 B2 | 3/2010 | Louwsma et al. |
| 7,688,270 B2 | 3/2010 | Tsushima |
| 7,704,684 B2 | 4/2010 | Rogers et al. |
| 7,791,271 B2 | 9/2010 | Cok et al. |
| 7,799,699 B2 | 9/2010 | Nuzzo et al. |
| 7,816,856 B2 | 10/2010 | Cok et al. |
| 7,834,541 B2 | 11/2010 | Cok |
| 7,861,937 B2 | 1/2011 | Lazzerini |
| 7,893,612 B2 | 2/2011 | Cok |
| 7,919,342 B2 | 4/2011 | Cok |
| 7,927,976 B2 | 4/2011 | Menard |
| 7,932,123 B2 | 4/2011 | Rogers et al. |
| 7,943,491 B2 | 5/2011 | Nuzzo et al. |
| 7,969,085 B2 | 6/2011 | Cok |
| 7,972,875 B2 | 7/2011 | Rogers et al. |
| 7,982,296 B2 | 7/2011 | Nuzzo et al. |
| 7,990,058 B2 | 8/2011 | Cok et al. |
| 7,999,454 B2 | 8/2011 | Winters et al. |
| 8,029,139 B2 | 10/2011 | Ellinger et al. |
| 8,039,847 B2 | 10/2011 | Nuzzo et al. |
| 8,056,820 B2 | 11/2011 | Camus et al. |
| 8,198,621 B2 | 6/2012 | Rogers et al. |
| 8,207,547 B2 | 6/2012 | Lin |
| 8,243,027 B2 | 8/2012 | Hotelling et al. |
| 8,253,536 B2 * | 8/2012 | Kaminska ............... B42D 25/29 340/5.86 |
| 8,261,660 B2 | 9/2012 | Menard |
| 8,288,843 B2 | 10/2012 | Kojima et al. |
| 8,334,545 B2 | 12/2012 | Levermore et al. |
| 8,391,688 B2 | 3/2013 | Zhang et al. |
| 8,394,706 B2 | 3/2013 | Nuzzo et al. |
| 8,440,546 B2 | 5/2013 | Nuzzo et al. |
| 8,450,927 B2 | 5/2013 | Lenk et al. |
| 8,470,701 B2 | 6/2013 | Rogers et al. |
| 8,502,192 B2 | 8/2013 | Kwak et al. |
| 8,506,867 B2 | 8/2013 | Menard |
| 8,528,813 B1 | 9/2013 | Blossom |
| 8,664,699 B2 | 3/2014 | Nuzzo et al. |
| 8,686,447 B2 | 4/2014 | Tomoda et al. |
| 8,722,458 B2 | 5/2014 | Rogers et al. |
| 8,735,932 B2 | 5/2014 | Kim et al. |
| 8,754,396 B2 | 6/2014 | Rogers et al. |
| 8,766,970 B2 | 7/2014 | Chien et al. |
| 8,791,474 B1 | 7/2014 | Bibl et al. |
| 8,791,822 B2 | 7/2014 | Delia et al. |
| 8,794,501 B2 | 8/2014 | Bibl et al. |
| 8,803,857 B2 | 8/2014 | Cok |
| 8,817,369 B2 | 8/2014 | Daiku |
| 8,854,294 B2 | 10/2014 | Sakariya |
| 8,860,051 B2 | 10/2014 | Fellows et al. |
| 8,877,648 B2 | 11/2014 | Bower et al. |
| 8,884,844 B2 | 11/2014 | Yang et al. |
| 8,889,485 B2 | 11/2014 | Bower |
| 8,895,406 B2 | 11/2014 | Rogers et al. |
| 8,902,152 B2 | 12/2014 | Bai et al. |
| 8,946,760 B2 | 2/2015 | Kim |
| 8,987,765 B2 | 3/2015 | Bibl et al. |
| 9,153,171 B2 | 10/2015 | Sakariya et al. |
| 9,202,996 B2 | 12/2015 | Orsley et al. |
| 9,460,665 B2 * | 10/2016 | Jiang .................... G09G 3/3413 |
| 9,520,537 B2 | 12/2016 | Bower et al. |
| 9,626,908 B2 | 4/2017 | Sakariya et al. |
| 2001/0022564 A1 | 9/2001 | Youngquist et al. |
| 2002/0096994 A1 | 7/2002 | Iwafuchi et al. |
| 2003/0164611 A1 | 9/2003 | Schneider et al. |
| 2004/0061572 A1 | 4/2004 | Nakamura |
| 2004/0212296 A1 | 10/2004 | Nakamura et al. |
| 2004/0227704 A1 | 11/2004 | Wang et al. |
| 2004/0252933 A1 | 12/2004 | Sylvester et al. |
| 2005/0006657 A1 | 1/2005 | Terashita |
| 2005/0012076 A1 | 1/2005 | Morioka |
| 2005/0116621 A1 | 6/2005 | Bellmann et al. |
| 2005/0140275 A1 | 6/2005 | Park |
| 2005/0150740 A1 * | 7/2005 | Finkenzeller ............. G07F 1/06 194/207 |
| 2005/0168987 A1 | 8/2005 | Tamaoki et al. |
| 2005/0177480 A1 | 8/2005 | Huang |
| 2005/0275615 A1 | 12/2005 | Kahen et al. |
| 2006/0063309 A1 | 3/2006 | Sugiyama et al. |
| 2007/0035340 A1 | 2/2007 | Kimura |
| 2007/0077349 A1 | 4/2007 | Newman et al. |
| 2007/0201056 A1 | 8/2007 | Cok et al. |
| 2008/0035736 A1 | 2/2008 | Tompkin et al. |
| 2008/0211734 A1 | 9/2008 | Huitema et al. |
| 2009/0315054 A1 | 12/2009 | Kim et al. |
| 2010/0078670 A1 | 4/2010 | Kim et al. |
| 2010/0084850 A1 * | 4/2010 | Jackson ................. B42D 25/29 283/83 |
| 2010/0123268 A1 | 5/2010 | Menard |
| 2010/0148198 A1 | 6/2010 | Sugizaki et al. |
| 2010/0214247 A1 | 8/2010 | Tang et al. |
| 2010/0248484 A1 | 9/2010 | Bower et al. |
| 2010/0258710 A1 | 10/2010 | Wiese et al. |
| 2010/0317132 A1 | 12/2010 | Rogers et al. |
| 2011/0211348 A1 | 9/2011 | Kim |
| 2012/0119249 A1 | 5/2012 | Kim et al. |
| 2012/0223875 A1 | 9/2012 | Lau et al. |
| 2012/0228669 A1 | 9/2012 | Bower et al. |
| 2012/0314388 A1 | 12/2012 | Bower et al. |
| 2013/0015483 A1 | 1/2013 | Shimokawa et al. |
| 2013/0069275 A1 | 3/2013 | Menard et al. |
| 2013/0088416 A1 | 4/2013 | Smith et al. |

(56) References Cited

U.S. PATENT DOCUMENTS

| | | |
|---|---|---|
| 2013/0196474 A1 | 8/2013 | Meitl et al. |
| 2013/0207964 A1 | 8/2013 | Fleck et al. |
| 2013/0221355 A1 | 8/2013 | Bower et al. |
| 2013/0273695 A1 | 10/2013 | Menard et al. |
| 2014/0104243 A1 | 4/2014 | Sakariya et al. |
| 2014/0175498 A1 | 6/2014 | Lai |
| 2014/0217448 A1 | 8/2014 | Kim et al. |
| 2014/0231839 A1 | 8/2014 | Jeon et al. |
| 2014/0231851 A1 | 8/2014 | Tsai et al. |
| 2014/0264763 A1 | 9/2014 | Meitl et al. |
| 2014/0267683 A1 | 9/2014 | Bibl et al. |
| 2014/0300095 A1* | 10/2014 | Tompkin .......... B42D 25/30 283/67 |
| 2014/0306248 A1 | 10/2014 | Ahn et al. |
| 2014/0367633 A1 | 12/2014 | Bibl et al. |
| 2014/0367705 A1 | 12/2014 | Bibl et al. |
| 2015/0135525 A1 | 5/2015 | Bower |
| 2015/0137153 A1 | 5/2015 | Bibl et al. |
| 2015/0169011 A1 | 6/2015 | Bibl et al. |
| 2015/0263066 A1 | 9/2015 | Hu et al. |
| 2015/0280066 A1 | 10/2015 | Fujimura et al. |
| 2015/0280089 A1 | 10/2015 | Obata et al. |
| 2015/0363614 A1 | 12/2015 | Yeager et al. |
| 2015/0371585 A1 | 12/2015 | Bower et al. |
| 2015/0371974 A1 | 12/2015 | Bower et al. |
| 2015/0372051 A1 | 12/2015 | Bower et al. |
| 2015/0372052 A1 | 12/2015 | Bower et al. |
| 2015/0372053 A1 | 12/2015 | Bower et al. |
| 2015/0373793 A1 | 12/2015 | Bower et al. |
| 2016/0004947 A1 | 1/2016 | Pueschner et al. |
| 2016/0005721 A1 | 1/2016 | Bower et al. |
| 2016/0018094 A1 | 1/2016 | Bower et al. |
| 2016/0064363 A1 | 3/2016 | Bower et al. |
| 2016/0068005 A1* | 3/2016 | Fischer .......... B42D 25/305 283/83 |
| 2016/0093600 A1 | 3/2016 | Bower et al. |
| 2017/0206845 A1 | 7/2017 | Sakariya et al. |
| 2017/0246899 A1 | 8/2017 | Cok et al. |

FOREIGN PATENT DOCUMENTS

| | | |
|---|---|---|
| EP | 2 062 204 B1 | 3/2012 |
| EP | 1 059 620 B1 | 2/2013 |
| EP | 1 301 355 B2 | 11/2015 |
| GB | 2 496 183 A | 5/2013 |
| WO | WO-2004/056583 A1 | 7/2004 |
| WO | WO-2006/027730 A1 | 3/2006 |
| WO | WO-2006/099741 A1 | 9/2006 |
| WO | WO-2008/103931 A2 | 8/2008 |
| WO | WO-2010/032603 A1 | 3/2010 |
| WO | WO-2010/111601 A2 | 9/2010 |
| WO | WO-2010/132552 A1 | 11/2010 |
| WO | WO-2013/064800 A1 | 5/2013 |
| WO | WO-2013/165124 A1 | 11/2013 |
| WO | WO-2014/121635 A1 | 8/2014 |
| WO | WO-2014/149864 A1 | 9/2014 |
| WO | WO-2016/037895 A1 | 3/2016 |
| WO | WO-2017/148875 A1 | 9/2017 |

OTHER PUBLICATIONS

Lee, S. H. etal, Laser Lift-Offof GaN Thin Film and its Application to the Flexible Light Emitting Diodes, Proc. of SPIE 8460:846011-1-846011-6 (2012).

Roscher, H., VCSEL Arrays with Redundant Pixel Designs for 10Gbits/s 2-D Space-Parallel MMF Transmission, Annual Report, optoelectronics Department, (2005).

Written Opinion, PCT/EP2017/054537, 7 pages, dated Jun. 30, 2017.

Yaniv et al., A 640×480 Pixel Computer Display Using Pin Diodes with Device Redundancy, 1988 International Display Research Conference, IEEE, CH-2678-1/88:152-154 (1988).

Partial Search Report, PCT/EP2017/059221 (Wirelessly Powered Display and System, filed Apr. 19, 2017) issued by ISA/EP 2 pages (dated Sep. 18, 2017).

Provisional Opinion Accompanying the Partial Search Report, PCT/EP2017/059221 (Wirelessly Powered Display and System, filed Apr. 19, 2017) issued by ISA/EP 11 pages (dated Sep. 18, 2017).

* cited by examiner

HYBRID DOCUMENT WITH VARIABLE STATE

PRIORITY APPLICATION

This patent application is a continuation-in-part of U.S. patent application Ser. No. 15/433,119 entitled Hybrid Banknote with Electronic Indicia, filed Feb. 15, 2017, which claims priority to U.S. Provisional Patent Application Ser. No. 62/301,211 entitled Hybrid Banknote with Electronic Indicia, filed Feb. 29, 2016, the contents of which are hereby incorporated by reference herein in its entirety.

FIELD OF THE INVENTION

The present invention relates to currency and particularly to banknotes having electronically controlled inorganic light-emitting diodes embedded in the banknotes.

BACKGROUND OF THE INVENTION

Monetary instruments issued by governments such as money or currency are used throughout the world today. Government-issued currency typically includes banknotes (also known as paper currency or bills) having visible markings printed on high-quality paper, plastic, or paper impregnated with other materials, such as plastic. The visible markings indicate the denomination (value) of the banknote, includes a serial number, and has decorations such as images, and anti-counterfeiting structures such as special threads, ribbons, and holograms. Currency circulates within an economic system as a medium of monetary exchange having a fixed value until it is physically worn out. Worn out banknotes are generally returned by banks or other financial institutions and then replaced.

Other privately issued monetary instruments are also used, such as credit cards and gift cards. These cards typically include an electronically accessible value (e.g., stored in a magnetic stripe or in a chip in the card) or an electronically accessible account that can be used to make purchases. However, the value of the card is not readily viewed by a user without special equipment, such as a reader.

In the past, banknotes have not been electronically enabled. However, more recently there have been proposals to use RFID (radio-frequency identification device) in banknotes to validate the banknote and avoid counterfeiting. For example, U.S. Pat. No. 8,391,688 and U.S. Pat. No. 8,791,822 disclose systems for currency validation. U.S. Pat. No. 5,394,969 describes a capacitance-based verification device for a security thread embedded within currency paper to defeat counterfeiting. Security systems for scanning a paper banknote and checking identification information in the banknote (e.g., the serial number) with a network-accessible database have been proposed, for example in U.S. Pat. No. 6,131,718. In all of these systems, however, there is no way to visibly test small details of a banknote without using a separate electronic or optical reader.

There remains a need therefore, for currency providing a variable value that is electronically accessible with visible indicia without using a separate electronic or optical reader.

SUMMARY OF THE INVENTION

The present invention provides a hybrid currency banknote having visible markings and one or more light-controlling elements, for example inorganic light-emitting diodes (iLEDs), and a controller embedded in or on the banknote and electrically connected to control the light-controlling elements to emit light. A power input connection is electrically connected to the controller, or one or more light-controlling elements, or both. In a further embodiment, a power source, such as a piezoelectric or photovoltaic device, is electrically connected to the power input connection, with or without a power convertor. In various embodiments, the visible markings include printed images or value indicators. The light-controlling elements can form a graphic indicator such as a number, letter, or pictogram or can highlight a visible marking on the banknote. The light-controlling elements can form a display, for example a monochrome or full-color display.

In one embodiment, the light-controlling elements or controller are printed on the pre-printed banknote. In another embodiment, the light-controlling elements or controller is printed on a ribbon or thread that is subsequently woven or otherwise incorporated into the banknote. The ribbon or thread can also include electrical conductors to electrically connect the controller, the light-controlling elements, and the power source in a circuit. When operated by applying power, the controller controls the light-controlling elements to emit light, for example in a spatial pattern, or in a temporal pattern (for example with flashing lights or sequentially flashing lights), or both. Different light-controlling elements 30 can be activated in response to sequential squeezes of the piezoelectric power source 60.

The currency can also include light pipes (optical waveguides) arranged in association with the light-controlling elements. The light pipes can conduct light to desired locations on the banknote or can form patterns such as graphic indicators. The light pipes can include light-emitting portions, for example diffusers, along the length of the light pipes to emit light at locations along the length of the light pipe as well as at the end of the light pipe.

The controller can include a memory, for example a read-only memory or a write-once memory storing one or more values and the light-controlling elements can be controlled to display numerals corresponding to the values. Multiple values can be stored in a sequential order corresponding to a temporally sequential set of values and can monotonically decline in magnitude. Values stored in the banknote can be electronically read by a teller machine having a reader and the value of the banknote displayed on the teller machine. In a further embodiment, the teller machine can write a value to the banknote using a writer. In an embodiment, the controller controls the written value so that it must be equal to or smaller than a value already stored in the banknote.

A method of making a hybrid currency banknote includes providing a banknote having visible markings, a wafer having a plurality of micro-transfer printable light-controlling elements, and a wafer having a plurality of controllers. One or more of the light-controlling elements and at least one controller are embedded in the banknote, for example by micro-transfer printing onto the banknote or onto a thread or ribbon that is subsequently incorporated into the banknote. The controller is electrically connected to the one or more light-controlling elements and to a power input connection. A power source can also be provided, for example by micro-transfer printing the power source on the banknote or ribbon. An issuer of the hybrid currency banknote can provide a memory with a value or write the value to a memory in the banknote to provide the banknote with a value.

The hybrid currency banknote of the present invention can be used by receiving the banknote and providing power to the power input connection, for example by a teller machine that then displays the value of the banknote on the banknote itself or on a display incorporated into the teller machine. Alternatively, the banknote includes a piezoelectric power source and upon squeezing the power source the controller controls the light-controlling elements to emit light. In another embodiment, the banknote includes a photovoltaic power source and upon exposure to electromagnetic radiation (such as infrared or ultraviolet radiation), the controller controls the light-controlling elements to emit light.

A user can insert a received banknote into a teller machine, input an input value to the teller machine, and the teller machine can write a value derived from the input value into the banknote. The input value can represent the value of a monetary transaction, for example a purchase of goods or payment of debt and the difference between the input value and the current value can be written into the hybrid currency banknote.

The present invention provides an anonymous, government-issued currency with anti-counterfeiting light emitters whose value can be visibly ascertained without requiring specialized equipment and modified electronically.

BRIEF DESCRIPTION OF THE DRAWINGS

The foregoing and other objects, aspects, features, and advantages of the present disclosure will become more apparent and better understood by referring to the following description taken in conjunction with the accompanying drawings, in which.

Figure 1:
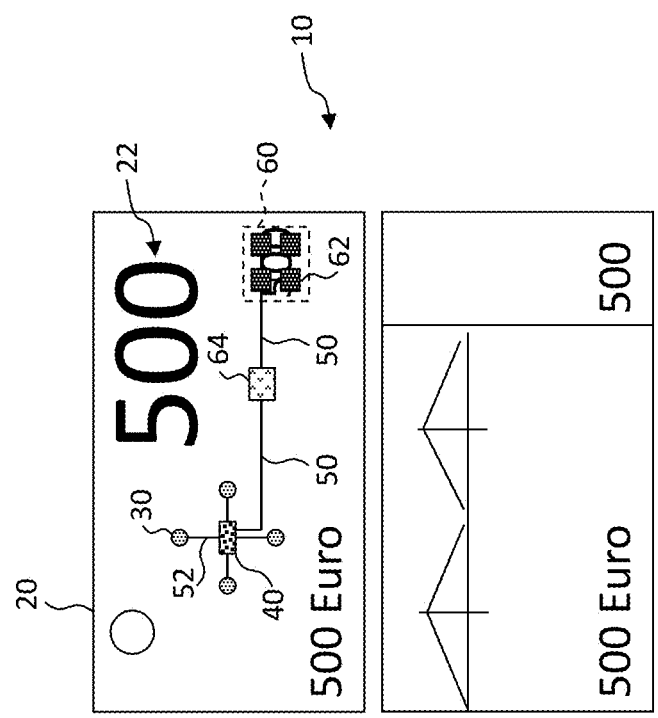
FIG. 1 is a plan view of the front and back sides of an embodiment of the present invention.

The features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. The figures are not drawn to scale since the variation in size of various elements in the Figures is too great to permit depiction to scale.

DETAILED DESCRIPTION OF THE INVENTION

Referring to FIG. 1, in an embodiment of the present invention a hybrid currency banknote 10 includes a banknote 20 having visible markings 22. The banknote 20 can be a government-issued banknote 20 indicated by the visible markings 22 and can comprise a flexible substrate that includes paper, plastic, or impregnated paper. One or more light-controlling elements 30 are embedded in or on the banknote 20 and can be printed on the flexible substrate. A controller 40 is embedded in or on the banknote 20 and electrically connected to the one or more light-controlling elements 30 for controlling the one or more light-controlling elements 30. A power input connection 50 is electrically connected to the controller 40, one or more light-controlling elements 30, or both. In a further embodiment, a power source 60 is electrically connected to the power input connection 50, for example directly to the power input connection 50 (not shown) or through a power convertor 64 (as shown). The power source 60 and the controller 40 can be a common element or a common circuit and the controller 40 can be a power conditioning circuit or can include analog or digital control circuitry. The controller 40, the light-controlling elements 30 and the power input connection 50 can be electrically connected, for example with wires 52. Multiple controllers 40 can be used to provide redundancy, reduce failures, and increase lifetime. The multiple controllers 40 can be connected in parallel with common input, output, power, and ground connections. In other embodiments, the controller 40 can include multiple circuits in multiple integrated circuits and include discrete components, such as capacitors and resistors that can provide additional control support, for example as timing or trimming devices to support light-controlling element 30 flash rates, filter devices such as acoustic wave devices (either bulk or surface).

The power source 60 can be a piezoelectric power source or a photovoltaic power source and the power convertor 64 can convert the power provided by the power source 60 to a form that is used by the controller 40, the light-controlling elements 30, or both. The power convertor 64 can include power storage, for example using capacitors such as thin-film capacitors with a high-K dielectric to provide power over a time period. The capacitors can be distributed, for example located among the power components 62. Output diodes can be used to isolate the power supplies 60 or light-controlling elements 30. In one arrangement, the power source 60 is indicated by the visible markings 22, the power source 60 forms a part of the visible markings 22, or the power source 60 is obscured by the visible markings 22. Multiple power sources 60 and multiple power convertors 64 can be used to provide redundancy.

In an embodiment, the power source 60 comprises a plurality of electrically connected but physically separated individual power components 62. The power components 62 can be arranged in a 2-d array (as shown) or a 1-d array (not shown) and operated by squeezing, waving, or sliding an object across the power components 62. The power components 62 can be a group of elements that are operated at the same time with a single action, for example pressure applied to all of the power components 62 simultaneously. The power components 62 can be electrically arranged in series to achieve a desired voltage or in parallel to achieve a desired current or some combination of series and parallel to achieve the desired power characteristics.

The light-controlling elements light-controlling elements 30 can be inorganic light-emitting diodes 30 such as micro-light-emitting diodes suitable for micro-transfer printing, for example made on a semiconductor wafer adapted to the manufacture of inorganic light-emitting diodes 30. In general, the light-controlling elements 30 can be light-emitting elements, light-reflecting elements, inorganic light-emitting diodes, organic light-emitting diodes, micro-electromechanical reflective elements, reflective electrophoretic elements, or reflective electrochromic display elements. For clarity of exposition, the light-controlling elements 30 of the present invention are referred to below as inorganic light-emitting diodes (iLEDs) 30. However, in various embodiments the present invention contemplates the use of a corresponding variety of light-controlling elements 30. In another embodiment, the light-controlling elements 30 are also energy harvesting elements (for example silicon photodiodes) and provide power as part of the power source 60.

The controller 40 can also be an integrated circuit, for example a small chiplet, suitable for micro-transfer printing. The controller 40 can include digital circuits or logic (for example CMOS circuits) and power circuits (for example for driving an LED). The controller 40 can include information storage circuits, a state machine, or a stored program machine to implement the desired functionality of the hybrid currency banknote 10. The controller 40 can read or write information such as currency values, process information, respond to input and provide output. The power connection 50 can be directly connected to the controller 40 (as shown) or to the iLEDs 30, or both. Alternatively, the power connection 50 can indirectly connect to the controller 40 or the iLEDs 30, or both through the power convertor 64 (not shown). The power connection 50 can be an electrical conductor, for example small wires 52, and can include power connection pads that, when electrically connected to a power source, (such as a 3.3-volt, 5-volt, or 12-volt power source), provides power to the controller 40 and iLEDs 30 to enable them to function. The power source can be external (not shown) or can be provided by the internal power source 60.

It can be desirable to fold or spindle the hybrid currency banknote 10 of the present invention. To facilitate such a manipulation, in an embodiment of the present invention, the power source 60 comprises a plurality of electrically connected smaller individual power components 62. A single large power source 60 can be too rigid to readily fold or curve, whereas an arrangement of individual smaller physically separate power components 62 can allow folding between the smaller power components 62, even if the smaller power components 62 themselves are relatively rigid.

In a further embodiment, the iLEDs 30 and controller 40 are too small to be readily visible with the unaided human eye. Furthermore, the iLEDs 30 and controller 40 can be located in areas of the banknote 20 that include visible markings 22 to further obscure the presence of the iLEDs 30 and controller 40, as well as any wires 52. Similarly, the power source 60 or an arrangement of individual smaller power components 62 can be obscured by the visible markings 22. In one embodiment, any of the iLEDs 30, controller 40, wires 52, power source 60, power components 62, or power convertor 64 are marked with visible markings 22. For example, ink can be printed over the iLEDs 30, controller 40, wires 52, power source 60, power components 62, or power convertor 64 to obscure them or otherwise make them a part of the visible markings 22 on the banknote 20. Since the iLEDs 30, controller 40, wires 52, power source 60, power components 62, or power convertor 64 can each be very small, for example having a size in the micron range, they can be effectively invisible to the unaided human eye. For example, the one or more inorganic micro light-emitting diodes 30 or the controller 40 of the hybrid currency banknote 10 can have a width from 2 to 5 µm, 5 to 10 µm, 10 to 20 µm, or 20 to 50 µm, a length from 2 to 5 µm, 5 to 10 µm, 10 to 20 µm, or 20 to 50 µm, or a height from 2 to 5 µm, 4 to 10 µm, 10 to 20 µm, or 20 to 50 µm.

Figure 2:
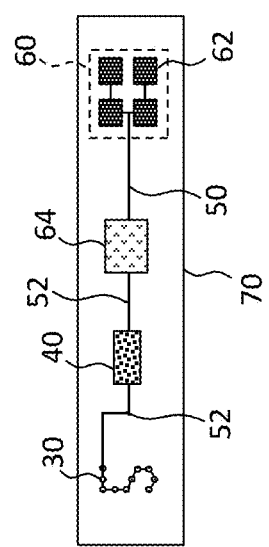
FIG. 2 is a schematic diagram according to an embodiment of the present invention.

In one embodiment of the present invention, the iLEDs 30 and controller 40 are directly printed onto a banknote 20, for example before or after the banknote 20 is printed with ink. In this embodiment, wires 52 can be woven into the banknote 20 in predetermined locations at which the iLEDs 30 and controller 40 are printed before or after the iLEDs 30 and controller 40 are printed. Referring to FIG. 2 in another embodiment, the banknote 20 includes a metalized or metallic ribbon 70 or thread, for example Mylar, with a pattern of electrical conductors or wires 52. The iLEDs 30 and controller 40 are printed, for example micro-transfer printed, onto the ribbon 70 before or after the electrical conductors such as wires 52 are formed, patterned, or impressed into the ribbon 70 to make an electrical circuit. In such an embodiment, the iLEDs 30 and controller 40 can include at least a portion of a tether, resulting from the fracturing of a tether on a source wafer from which the iLEDs 30 and controller 40 originate and that connects the iLEDs 30 and controller 40 to an anchor on the source wafer in the micro-transfer printing process. The ribbon 70 or thread is then incorporated into the banknote 20 to make an embodiment of the hybrid currency banknote 10 of the present invention. The power source 60 (and any power components 62), power convertor 64, or power input connection 50 can likewise be formed in the ribbon 70. Alternatively, some components can be on the ribbon 70 and others not on the ribbon 70, in particular the power source 60.

Figure 3:
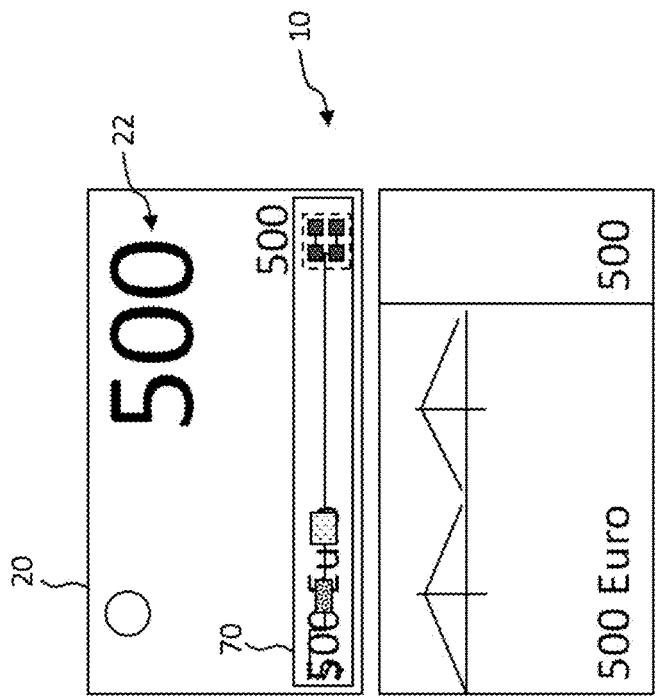
FIG. 3 is a plan view of the front and back sides of another embodiment of the present invention.

Referring to FIG. 3, in an embodiment the one or more inorganic LEDs 30 are disposed in a location corresponding to a portion of the visible markings 22 to highlight or otherwise indicate the portion of the visible markings 22. For example, the one or more inorganic LEDs 30 can underline or surround a graphic element of the visible markings 22. As shown in FIG. 3, the one or more inorganic LEDs 30 outline the numeral 5. Thus, the one or more inorganic LEDs 30 can be disposed to form a graphic indicator such as any of one or more of a number, a letter, and a pictogram. The graphic indicator can have semantic content, for example indicating a value, a date, or a person.

Figure 4:
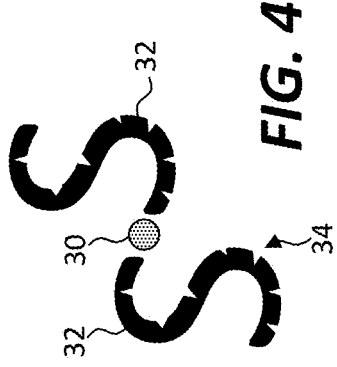
FIG. 4 is an illustration of a light pipe according to an embodiment of the present invention.

Referring next to FIG. 4, one or more light pipes 32 are located in association with the one or more inorganic light-emitting diodes 30 to transmit light emitted by the inorganic light-emitting diodes 30 through the light pipes 32 and emit the transmitted light from the opposite end of the light pipe 32. In an embodiment, the light pipes 32 include portions that leak light at desired locations, for example by purposefully forming nicks, scratches, or other forms of light diffusers 34 in the light pipes 32 to allow light to leak from the light pipe 32. Thus, the arrangement of the light pipes 32 can also correspond to a portion of the visible markings 22 to highlight or otherwise indicate the portion of the visible markings 22, form a graphic indicator, or form any one or all of a number, a letter, and a pictogram to indicate a value, a date, or a person.

Figure 5:
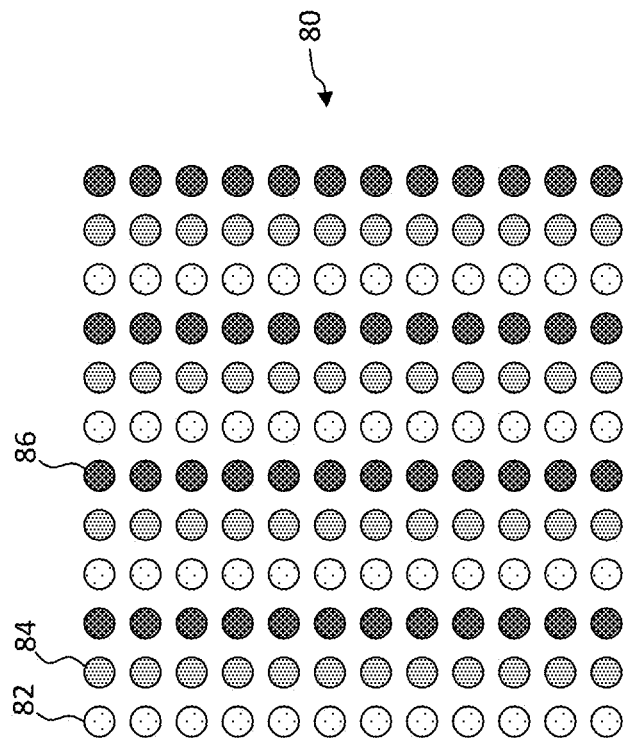
FIG. 5 is a schematic illustration of a display according to an embodiment of the present invention.

The controller 40 can control the one or more inorganic light-emitting diodes 30 to flash or sequentially flash individual iLEDs 30, forming spatial, temporal, or temporal-spatial light patterns. Referring to FIG. 5, in an embodiment, the inorganic light-emitting diodes 30 can emit different colors of light. For example, a red light-emitting diode 82 can emit red light, a green light-emitting diode 84 can emit green light, and a blue light-emitting diode 86 can emit blue light. The different inorganic light-emitting diodes 30 can be arranged spatially to form a display 80, a two-dimensional array, or a graphic element.

Figure 6:
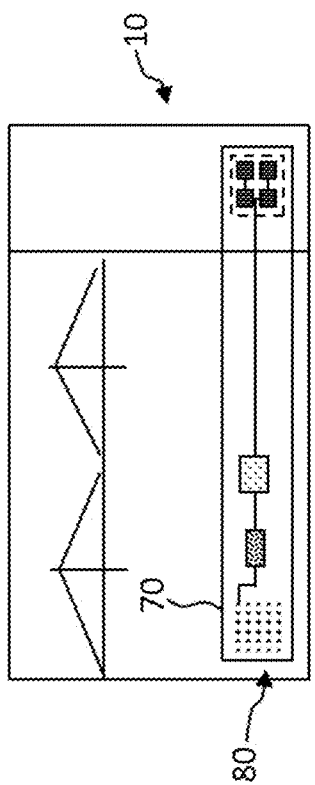
FIG. 6 is a schematic diagram of one side of a hybrid currency banknote according to another embodiment of the present invention.
Figure 7:
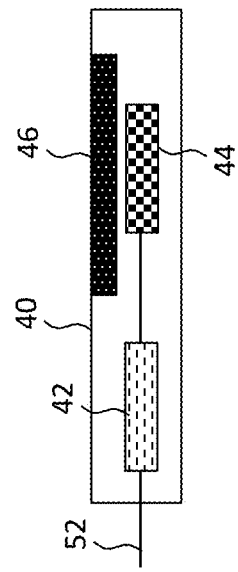
FIG. 7 is a schematic diagram illustrating a controller and circuit according to another embodiment of the present invention.

In another embodiment of the present invention and referring to FIG. 6, the hybrid currency banknote 10 includes visible markings 22 that do not include a value. Such a hybrid currency banknote 10 can be a non-denominational banknote that either has an assigned value or a variable value stored in a memory 44 in the controller 40, as shown in FIG. 7. Referring to FIG. 7, an assigned value can be provided by providing a circuit 42 and memory 44 in the controller 40 or providing circuits 42, such as the memory 44, connected to the controller 40. The memory 44 can be a read-only memory that encodes a desired assigned value. The assigned value can be a currency value or can include an electronic serial number, or both. The assigned value can be discovered by providing power to the power input connection 50. The power energizes the controller 40 which, in turn, controls the iLEDs 30 to display or otherwise indicate the assigned value. The memory 44 can be protected from overwriting, damage, or alternative discovery by protective layers such as a protective shield 46 formed over the memory 44 to discourage exposure by light and protect the memory 44 from heat. The shield 46 can be a light shield, a light reflector, a light absorber, or a heat conductor.

Figure 9:
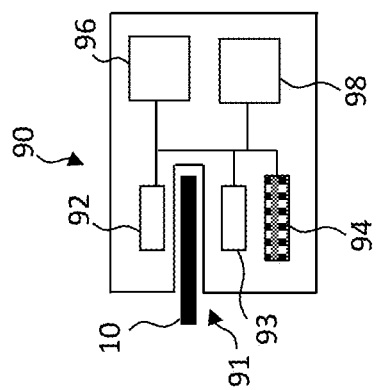
FIG. 9 is a schematic of a teller machine according to an embodiment of the present invention.
Figure 8:
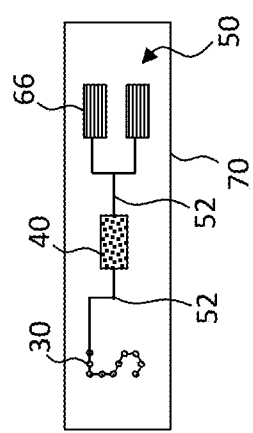
FIG. 8 is a schematic diagram illustrating a circuit according to another embodiment of the present invention.

In the case in which the assigned value is variable, the memory 44 can be a write-once memory that stores multiple values in memory locations that are ordered in a sequential order, for example by memory address. The write-once memory can, for example, employ fuses that are electrically destroyed and cannot be rewritten. Alternatively, the memory 44 can be a non-volatile read-write memory. In this case, the value stored by the hybrid currency banknote 10 can change over time. The current value can be discovered by providing power to the power input connection 50. The power energizes the controller 40 which, in turn, controls the iLEDs 30 to display or otherwise indicate the current value. The current value can be modified by, for example, a teller machine. Referring to FIGS. 8 and 9, in an embodiment of the present invention, the hybrid currency banknote 10 is adapted to a hybrid currency teller machine 90 that writes a value into the memory 44 in a memory storage location having an address sequentially after the address of a previous written value. As shown in FIG. 8, the power input connection 50 includes or is connected to power connection pads 66 that can be contacted by an external power source to provide power to the controller 40 and iLEDs 30 through wires 52. Referring to FIG. 9, a hybrid currency teller machine 90 includes a slot 91 into which a hybrid currency banknote 10 can be inserted. Once inserted into the hybrid currency teller machine 90, the hybrid currency banknote 10 is read by a reader 92 that can access the controller 40 or memory 44, for example by contacting electrical conductors to the power connection pads. (Only two power connection pads 66 are illustrated, but one or more power connection pads 66 can be included in various embodiments of the present invention). Once the current value of the hybrid currency banknote 10 is read, it can be displayed, for example on an optional teller machine display 96. If a change in the current value of the hybrid currency banknote 10 is desired, an input value can be input by a user with an input device 94. A teller machine controller 98 can then calculate or otherwise determine a new stored value responsive to the input value and store the new value in the hybrid currency banknote 10, for example by communicating the new stored value to the controller 40 which then writes the new stored value in the memory 44 with a writer 93. In an embodiment, the controller 40 only writes new stored values in the memory 44 that are smaller than the current value. In another embodiment, the controller 40 can write new stored values in the memory 44 that are larger than the current value, or that are larger than the current value but are limited to a maximum value. The change in current value of the hybrid currency banknote 10 can represent or be the result of a financial transaction, for example a purchase or a financial exchange with or facilitated by a financial institution such as a bank. Read-only memories, write-once memories, and read/write memories together with controllers and read/write circuitry (e.g., reader 92 and writer 93) can be formed in integrated circuits and electrical circuits. Devices for currency handling, optical inspection, making physical electronic contacts, displays, input devices (such as keyboards or touch screens) can be made using electromechanical, electronic, and optical technologies.

Figure 10:
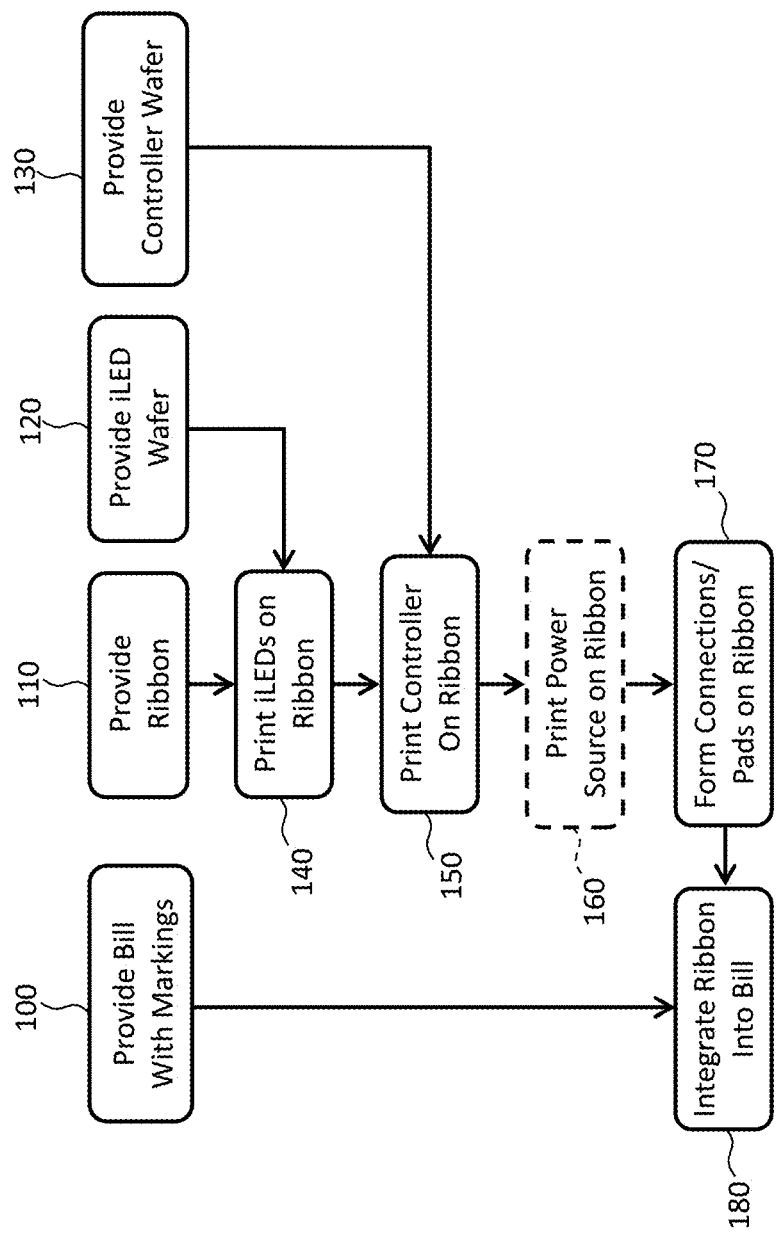
FIGS. 10-12 are flow charts illustrating methods of the present invention.

Referring to FIG. 10, a hybrid currency banknote 10 of the present invention can be made by providing a banknote 20 with markings in step 100, for example by printing on a high-quality paper with ink using intaglio printing. A ribbon 70 is provided in step 110, an inorganic LED wafer having micro-transfer printable iLEDs 30 is provided in step 120, and a controller wafer having micro-transfer printable controllers 40 is provided in step 130. The iLEDs 30 are micro-transfer printed from the inorganic LED wafer onto the ribbon 70 using a stamp to fracture tethers connecting the iLEDs 30 to the inorganic LED wafer leaving at least a portion of a tether on the iLEDs 30 in step 140. The controllers 40 are micro-transfer printed from the controller wafer onto the ribbon 70 using a stamp to fracture tethers connecting the controllers 40 to the controller wafer leaving at least a portion of a tether on the controllers 40 in step 150. Optionally, the power source 60 is similarly micro-transfer printed to the ribbon 70 in step 160. Power connection pads 66, wires 52 and any other necessary electrical conductors are formed in step 170 to make an electronic circuit having electrical conductors. The electrical conductors can be provided before or after the iLEDs 30 and controllers 40 are micro-transfer printed. The ribbon 70 can be further processed, for example to provide environmental robustness by coating with protective layers. The ribbon 70 is then integrated into the banknote 20 in step 180 to make the hybrid currency banknote 10 of the present invention. The hybrid currency banknote 10 can be further processed, for example by over coating or printing to provide environmental robustness, decoration, or to obscure the micro-transfer printed elements.

Figure 11:
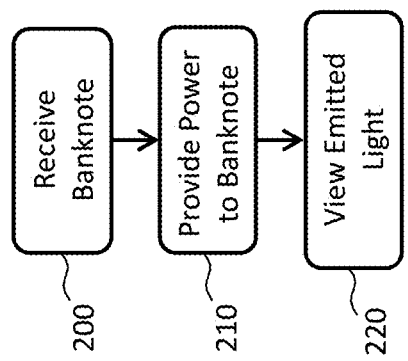

Referring to FIG. 11, the hybrid currency banknote 10 of the present invention can be used by first receiving the hybrid currency banknote 10 in step 200, providing power to the hybrid currency banknote 10 in step 210, and viewing light emitted by the hybrid currency banknote 10 in step 220. Power can be provided by connecting the hybrid currency banknote 10 to an external power source (e.g., using the power connection pads 66), squeezing a piezoelectric power source 60, or exposing a photovoltaic power source 60 to light.

Figure 12:
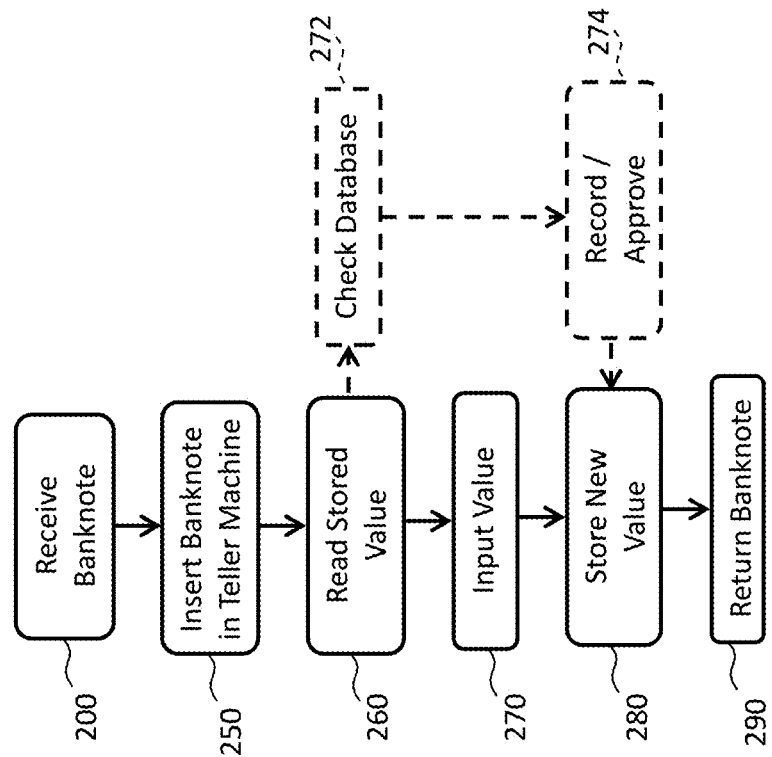

Referring to FIG. 12, an assigned or current value can be programmed into the controller 40 or an associated memory 44 (also micro-transfer printed if it is a separate integrated circuit or chiplet) either before or after the controller 40 or memory 44 is micro-transfer printed. Alternatively, an external device such as a hybrid currency teller machine 90 can communicate with the controller to write an assigned or current value to the hybrid currency banknote 10. For example, the hybrid currency banknote 10 can be received in step 200, inserted into the hybrid currency teller machine 90 in step 250, the current value read by the reader 92 in step 260, an input value input by the input device 94 in step 270, a new stored value responsive to the input value computed by the teller machine controller 98 and stored by the writer 93 in step 280 and the hybrid currency banknote 10 returned in step 290. Optionally, the hybrid currency teller machine 90 can also communicate with a central or remote database (step 272) to establish the legitimacy of the hybrid currency banknote 10, track its use or location, or approve a transaction and record or approve the transaction (step 274). The communication can include an electronic serial number.

U.S. patent application Ser. No. 14/743,981, filed Jun. 18, 2015, entitled Micro Assembled Micro LED Displays and Lighting Elements, incorporated herein by reference describes micro-transfer printing structures and processes useful with the present invention. For a discussion of micro-transfer printing techniques see also U.S. Pat. Nos. 8,722, 458, 7,622,367 and 8,506,867, each of which is hereby incorporated by reference in its entirety. Micro-transfer printing using compound micro assembly structures and methods can also be used with the present invention, for example, as described in U.S. patent application Ser. No. 14/822,868, filed Aug. 10, 2015, entitled Compound Micro-Assembly Strategies and Devices, which is hereby incorporated by reference in its entirety.

Figure 13:
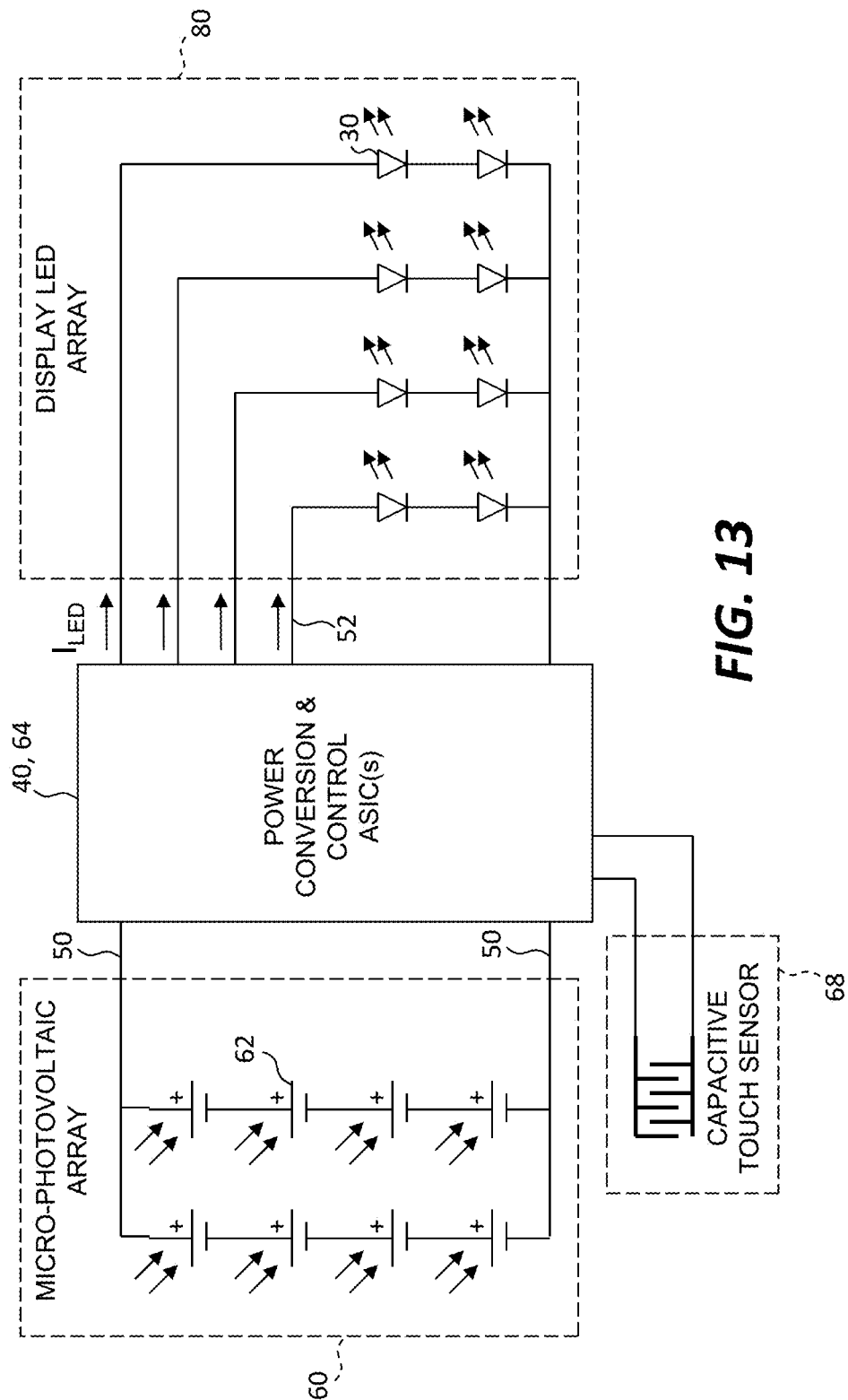
FIGS. 13-15 are schematic diagrams according to embodiments of the present invention.
Figure 14:
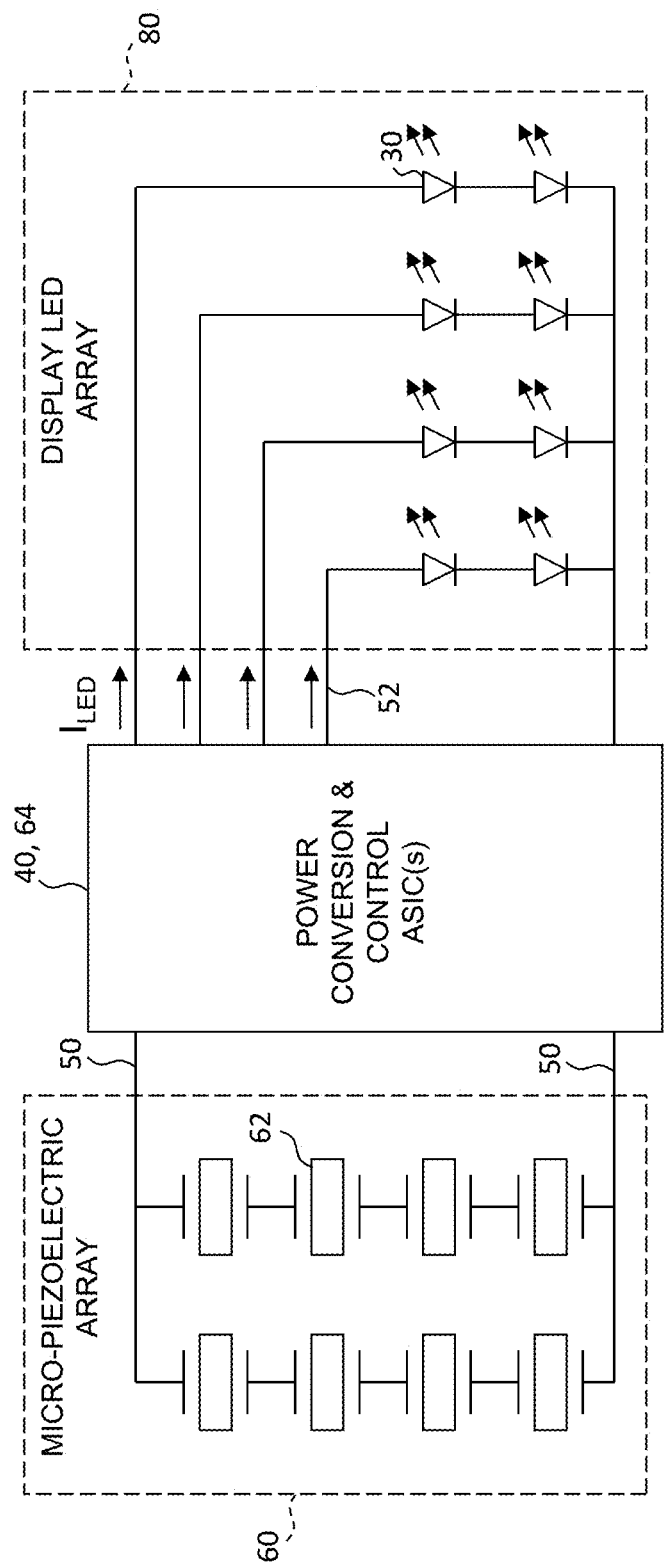
Figure 15:
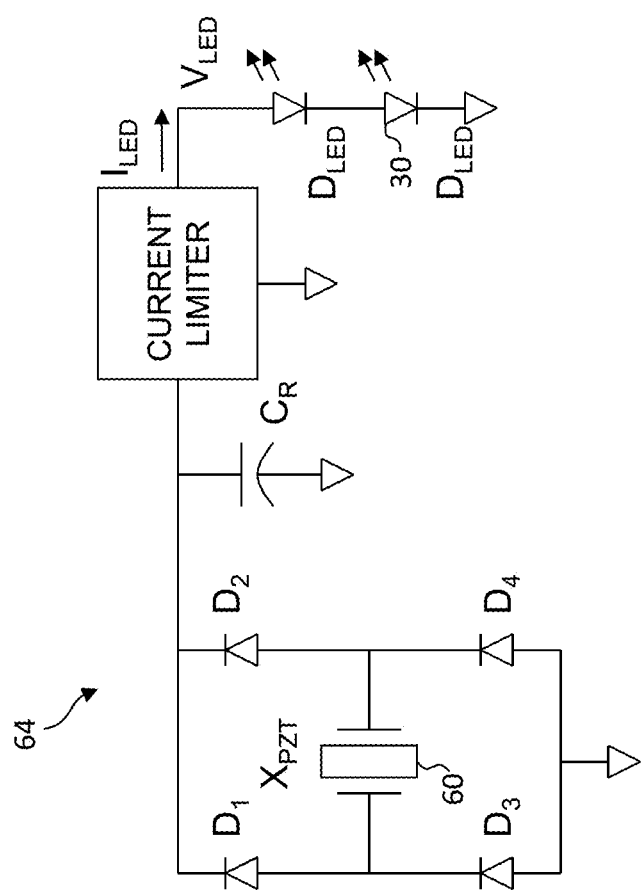

A simplified schematic of an embodiment of the present invention is illustrated in FIGS. 13 and 14. As shown in these Figures, a power source 60 includes two parallel groups of four series-connected power components 62 electrically connected to the power connection 50 and the power convertor 64 and controller 40. The power convertor 64 and controller 40 can be a single component, as shown, or include multiple different components such as separate integrated circuits. Control current from the power convertor 64 and controller 40 drives the iLEDs 30 of the display 80. A capacitive touch sensor 68 is also included (FIG. 13). In FIG. 13, the power source 60 is a photovoltaic power source. In FIG. 14, the power source 60 is a piezoelectric power source. FIG. 15 illustrates an example power convertor 64 and controller 40 having a four-diode bridge rectifier and storage capacitor $C_R$ providing power from a piezoelectric power source 60 to a current limiter that, in turn, provides current to the iLEDs 30. (The controller 40 can be powered by the power component 60 to control the iLEDs 30, but is not illustrated in FIG. 15. As noted above, the controller 40 and power component 60 can be a common component or circuit or can be separate or individual components or circuits.)

Figure 16:
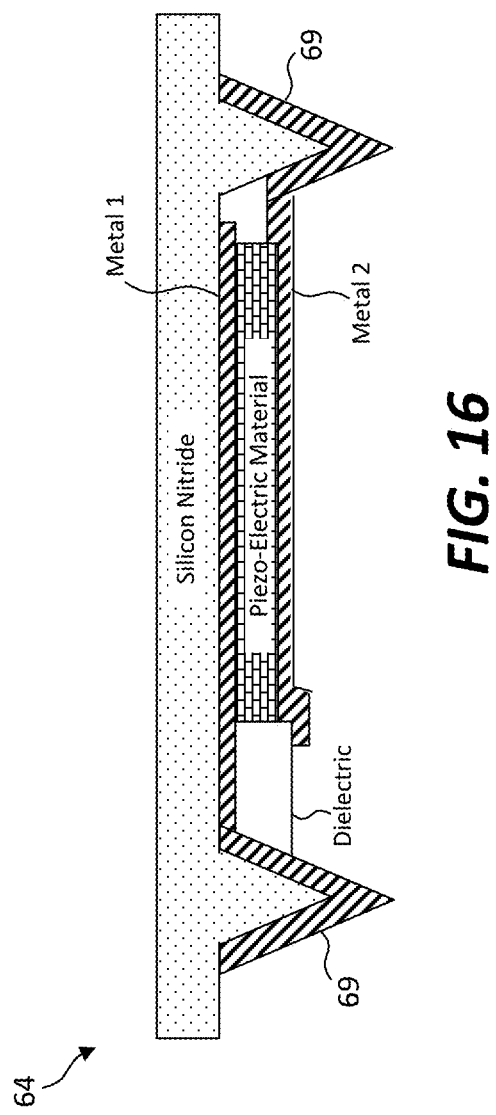
FIG. 16 is a cross section of a piezoelectric power component according to an embodiment of the present invention.

Referring to FIG. 16, a power component 64 can include a dielectric layer such as a silicon nitride layer with a first metal layer providing a first connection post 69 or spike. A piezoelectric material layer is in electrical contact with the first metal layer and, on a side of the piezoelectric material layer opposite the first metal layer, a second metal layer is in electrical contact with a second metal layer and forms a second connection post 69 or spike. The power component 64 of FIG. 16 can be micro-transfer printed onto two conductors (e.g., wires 52) so that the first and second connection posts 69 are in contact with the conductors. The first and second connection posts 69 can pierce or otherwise deform and adhere to the conductors after micro-transfer printing.

Figure 17:
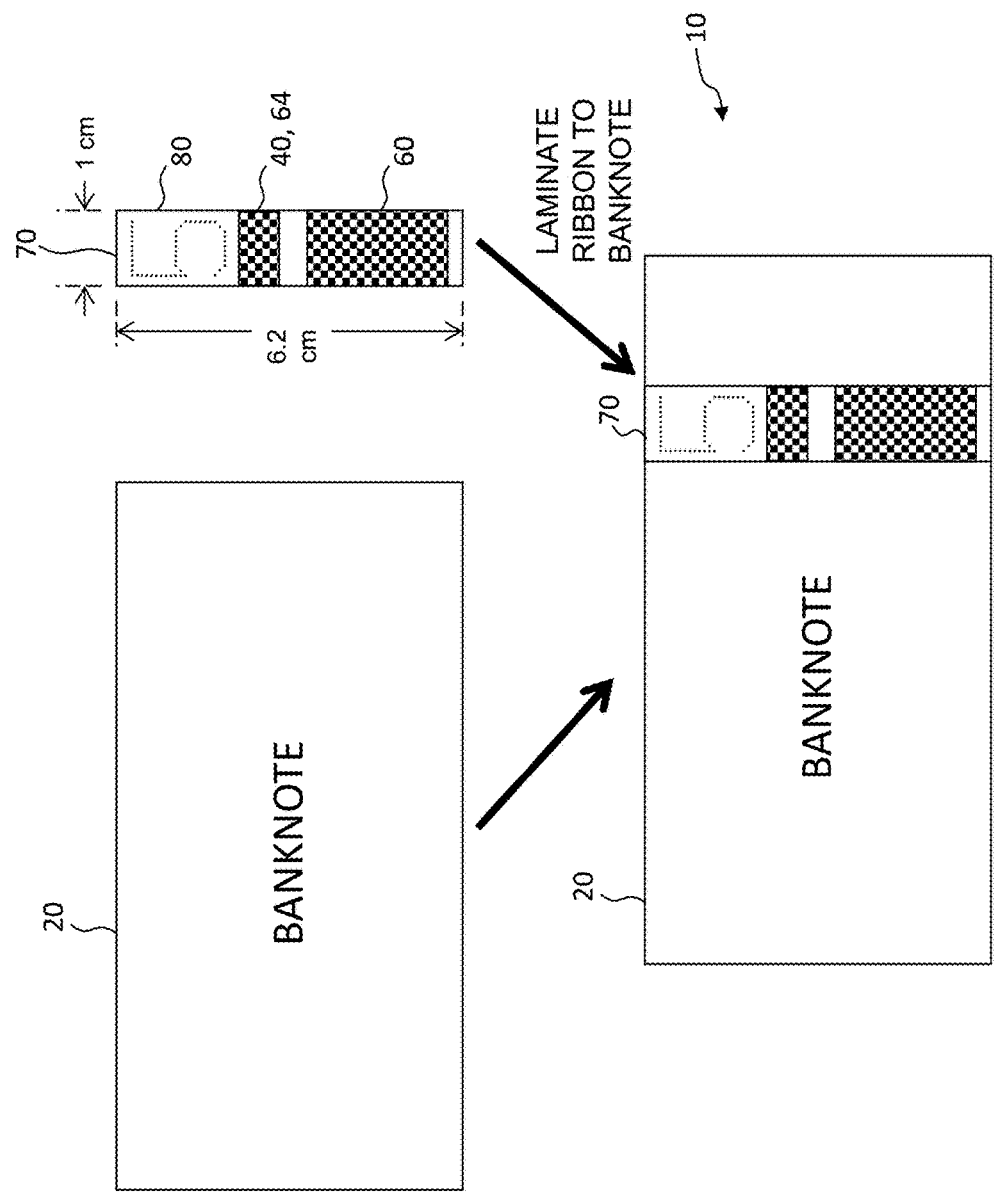
FIG. 17 is a schematic illustration of a method according to an embodiment of the present invention.

FIG. 17 illustrates the process of making a banknote 20 according to an embodiment of the present invention. A printed banknote is provided together with a ribbon 70 having an array of micro-transfer printed iLEDs 30 electrically connected to a controller, a power convertor 64, and a power source 60. The ribbon 70 is laminated or otherwise integrated into the banknote 20 to make a hybrid currency banknote 10.

Figure 18:
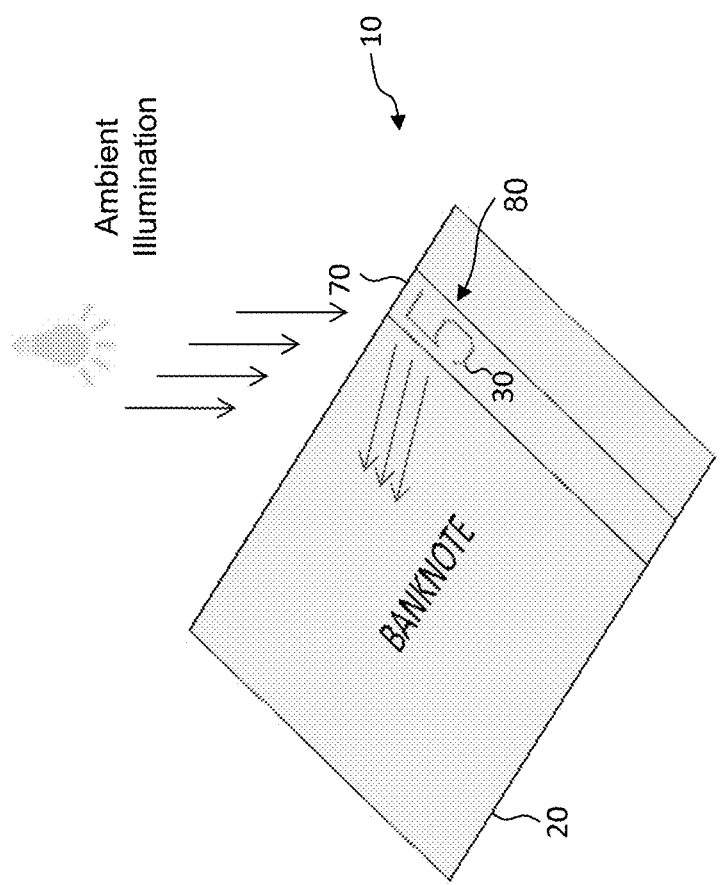
FIGS. 18 and 19 are schematic illustrations of methods of operating an embodiment of the present invention.

As shown in FIG. 18, a hybrid currency banknote 10 of the present invention having a photovoltaic power source 60 can be exposed to ambient illumination to provide power to iLEDs 30 in a display 80, causing the iLEDs 30 to emit light. It has been calculated that conventional ambient office light provides sufficient illumination (e.g., 500 lux) to operate a photovoltaic embodiment of the present invention, including digital control for iLEDs 30 sequencing, for example flashing. Photovoltaic cells (e.g., power components 62) can be GaAs having lateral dimensions of 50µ by 50µ and providing 66 µW in an array of 50,000 power components 62 and requiring approximately 1.27 cm². The array of power components 62 can occupy a larger area with a lower fill factor to provide apparent transparency and improved flexibility to the power source 60. A 20×20 array of 400 iLEDs 30 (for example, green-light-emitting iLEDs 30) can provide a readable display 80 in these conditions over a viewing angle of 140 degrees similar to displays found in body-worn electronic devices (e.g., watches, fitness trackers) and can consume 66 µW.

Figure 19:
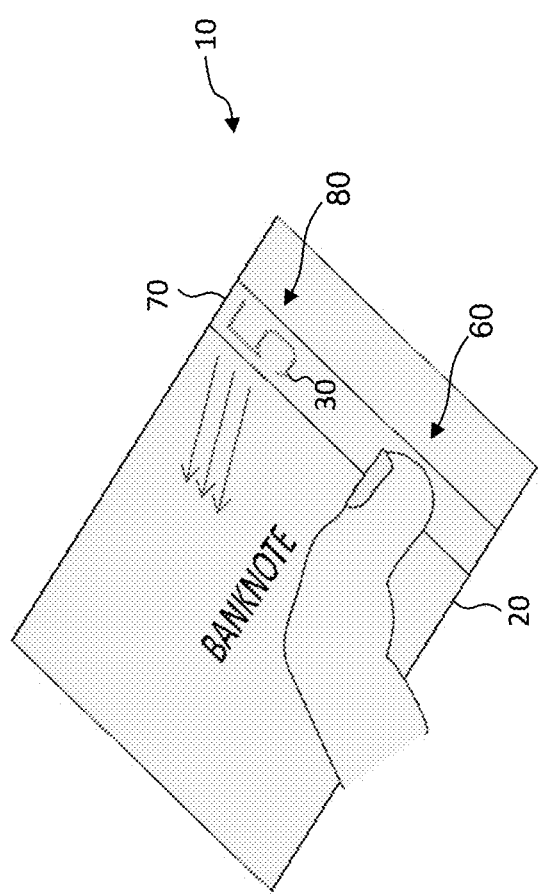

As shown in FIG. 19, a hybrid currency banknote 10 of the present invention having a piezoelectric power source 60 can be pressed or squeezed, for example, by a finger, to provide power to iLEDs 30 in a display 80, causing the iLEDs 30 to emit light. Power is provided both when pressing and releasing (hence the use of a bridge rectifier in FIG. 15). It has been demonstrated that finger tip having a one square cm area can provide a force of 35 N. Even with a smaller force of 10 N, a piezoelectric power source 60 with a total area of 0.06 cm² provides sufficient power to operate a piezoelectric embodiment of the present invention, including digital control for iLEDs 30 sequencing, for example flashing. The array of power components 62 can occupy a larger area (e.g., 0.5 cm² with a lower fill factor to provide apparent transparency and improved flexibility to the power source 60.

According to another embodiment of the present invention, a hybrid currency banknote 10 can have one or more energy output devices embedded in or on the banknote. The one or more energy output devices can be one or more of one or more light-emitting elements, a sound-emitting element, and a vibration element. The sound-emitting element can be a piezoelectric speaker and the vibration device can be a piezoelectric device. The elements can be controlled, powered, hidden, constructed, or otherwise provided in ways similar to those of the light-emitting elements 30 discussed at greater length above. Such alternative energy output modalities can be useful for persons with impaired vision.

In a further embodiment of the present invention, a hybrid document 10 (e.g., a hybrid currency banknote 10) comprises a document 20 having visible markings 22 and one or more light-controlling elements 30 (e.g., inorganic light-emitting diode 30) embedded in or on the document 20 (FIG. 1). A controller 40 includes a circuit 42 having a non-volatile read/write memory or a non-volatile write-once memory that stores multiple values in memory locations that are ordered in a sequential order (e.g., memory 44, FIG. 7). The controller 40 is embedded in or on the document 20 and is electrically connected to the one or more light-controlling elements 30 for controlling the one or more light-controlling elements 30. The electrical connection can be a wire connection or other connections, such as capacitive alternating current coupling connections, can be used to control the light-controlling element 30. The one or more light-controlling elements 30 can emit or control light of different colors and can be located in a variety of locations in or on the documents 20, for example in an array and controlled by the controller 40 to display fixed or programmable patterns. The controller 40 can control the power input connection 50 and the power input connection 50 can be electrically connected to any one or all of the controller 40, the circuit 42, the memory 44, or the one or more light-emitting elements 30. The memory 44 stores a state and the circuit 42 causes the one or more light-controlling elements 30 to indicate the state.

In various embodiments, the document 20 is a banknote 20 (as shown in FIG. 1), a bond, a stock certificate, a commercial certificate, a printed value-bearing document, an identification document, or a government-issued document, for example a passport or license. A bond can be a commercial, municipal, or corporate bond, a government-issued bond, or bearer bond, or other debt security. In one embodiment, the hybrid document 10 memory 44 includes an identifier or serial number, or other information such as printing date or origination.

As noted above, the memory 44 can store a variable value that can change over time, for example as the hybrid document 10 is used. In another embodiment, the memory 44 stores a binary state representing the value or validity of the hybrid document 10. For example, a banknote 20 can have an assigned value but, according to embodiments of the present invention, can be valid or invalid, depending on the state stored in the memory 44. Thus, the hybrid currency banknote 10 can be turned off (the state is invalid and the hybrid currency banknote 10 is not legal tender) and turned on (the state is valid and the hybrid currency banknote 10 is legal tender). This capability is useful for controlling banknotes 20, for example during transportation and manufacture. Thus, currency or other documents can be invalidated if they are expected to be at risk, for example from theft, and then validated when the risk is no longer present.

If the hybrid document 10 is a hybrid currency banknote 10, the state of the hybrid document 10 can be in addition to the variable value or can be the value. For example, a hybrid currency banknote 10 can have a fixed nominal value that is valid (effectively legal tender at the nominal value) or invalid (not legal tender and an effective value of zero). Alternatively, the nominal value is not fixed and, when the hybrid currency banknote 10 is valid it has the variable value and when it is invalid it has an effective value of zero.

As with the hybrid currency banknote 10 described above, the light-controlling elements 30 of the hybrid documents 10 can be light-emitting elements, light-reflecting elements, inorganic light-emitting diodes, organic light-emitting diodes, micro-electromechanical reflective elements, reflective electrophoretic elements, or reflective electrochromic display elements. The state of the hybrid document 10 can be indicated by lighting up or otherwise controlling one of the light-controlling elements 30. For example, a valid state can be indicated by flashing LEDs or lighting up a sequence of light-controlling elements 30 in a linear or circular motion. An invalid state can be indicated by not showing the light-controlling elements 30 as expected, by showing other light-controlling elements 30 (for example in a different color), or by showing the light-controlling elements 30 in a different configuration or sequence. In an embodiment of the present invention, the hybrid document 10 vibrates or emits acoustic signals, such as audible sounds, tones, or sequences of sound, for example in a melody using, for example, polymer piezo films or electrostatic speakers. A hybrid document 10 can include one or more output modes, for example a light-controlling mode or an acoustic mode, or both a light-controlling mode and an acoustic mode.

In configurations of the present invention, a power source 60 can be connected to the power input connection 50 of the hybrid document 10 (as shown in FIG. 1). The power source 60 can be a piezoelectric power source or a photovoltaic power source, can incorporate MEMs devices, and can be integrated into the hybrid document 10. For example, the power source can be integrated by being disposed on or within the hybrid document. The piezoelectric power source 60 can provide power in response to pressure, as described above, or, in other embodiments, in response to pushing, pulling, stretching, or waving the hybrid document 10 or providing other rapid movement, for example along the longest dimension of the hybrid document 10. Power can be provided using IR, UV, visible light, or other electromagnetic radiation to a photovoltaic unit via optical coupling. The electromagnetic radiation can be pulsed or encoded to provide information or signals. The electromagnetic energy source could be ambient light (for example the sun), broadband or narrowband artificial light (for example light bulbs or LEDs of various types), or narrowband high-energy sources, such as LEDs or lasers. In another embodiment, the power source 60 is external to the hybrid document 10 and power is transmitted to the controller 40 or light-controller elements 30, for example through electrical conductors in the hybrid documents 10. In other configurations, inductive or magnetic coupling is employed to transmit power.

In an embodiment of the present invention the state (or variable value, if it has one) of the hybrid document 10 is encrypted so that only special, authorized equipment can read the state from or, in particular, write the state into, the hybrid document 10. In one configuration, the state can be read for example with a public key and without requiring secret information, but cannot be written to except with secret information or tools (e.g., a private key). Thus, a hybrid document reader can be widely distributed, made publically available, and readily operable, but writers that can change the state of the hybrid document 10 are not. With such a distribution of hybrid document readers, it is relatively easy to determine if a hybrid document is valid, but relatively difficult to change the hybrid document state (either to validate or invalidate the hybrid document 10). Public/private encryption systems are known in the art and can be applied in the present invention.

In order to facilitate the use of hybrid documents 10 of the present invention, in some embodiments, the hybrid document 10 is adapted to a hybrid document validation machine (e.g., hybrid currency teller machine 90, FIG. 9) that changes the state of the hybrid document 10 from valid to invalid or from invalid to valid. The hybrid document validation machine 90 can include a hybrid document reader/writer 92/93 that can read the state of the hybrid document 10 or write the state of the hybrid document 10.

If the state of the hybrid document 10 is encrypted, the reader/writer 92/93 can be adapted to read or write the encrypted state. Furthermore, the reader/writer 92/93 can be adapted to read the state of the hybrid document 10 and compare the read state to a desired state, for example to test a hybrid document 10 to discover whether it has a desired state. The hybrid document validation machine 90 can be adapted to detect or read multiple hybrid documents 10 at a time, for example as is found in RFID detection systems.

The hybrid document validation machine 90 can comprise an optional display 96 and a reader/writer 92/93 adapted to accept one or more of the hybrid documents 10, change the state of the hybrid documents 10, and optionally display the state on the optional display 96. In embodiments, the hybrid document validation machine 90 can validate or invalidate a hybrid document 10. Furthermore, the reader/writer 92/93 of the hybrid document validation machine 90 can be adapted to accept the one or more hybrid documents 10 and count or evaluate the one or more hybrid documents 10. For example, the hybrid document validation machine 90 can count the number of valid and invalid hybrid documents 10 in a group or stack of hybrid documents 10 and calculate the aggregate value of the valid hybrid documents 10 and the nominal value of the invalid hybrid documents 10, as in a cash register or cash box.

In an embodiment in which the hybrid document 10 includes an identification, the hybrid document validation machine 90 can further comprise a record storage device. The reader/writer 92/93 is adapted to read the hybrid document identification and state and store the read identification and state. Thus, a database of the hybrid documents and their state and history maintained, for example for the use of an organization that makes, issues, or manages the hybrid documents 10. In an embodiment, the database is a secure database.

A method of using a hybrid document 10 can include providing a hybrid document 10 and a hybrid document validation machine 90. The hybrid document 10 has a state or can be received in a state and the hybrid document validation machine 90 is operated to set or change the state of the hybrid document 10.

In one embodiment, the hybrid document 10 is received in a state, for example a valid state, and then rendered invalid by operating a hybrid document validation machine 90. The invalidated hybrid documents 10 are then transported or stored in the invalid state while at risk, for example of theft. Once the hybrid documents 10 are delivered or to be made available, a hybrid document validation machine 90 is operated to change the state of the hybrid documents 10, for example from invalid to valid. Thus, embodiments of the present invention render hybrid documents 10 more secure.

In a further embodiment of the present invention, a hybrid document reader 93 (not necessarily a writer 92) can read the state of the hybrid document 10 and compare the read state to the state of the hybrid document 10 stored in the database, for example a secure on-line database, and if the read state and the stored state do not match, alert an operator or hybrid document authority to the discrepancy. Thus, unauthorized attempts to modify hybrid documents 10 can be detected.

As is understood by those skilled in the art, the terms "over", "under", "above", "below", "beneath", and "on" are relative terms and can be interchanged in reference to different orientations of the layers, elements, and substrates included in the present invention. For example, a first layer on a second layer, in some embodiments means a first layer directly on and in contact with a second layer. In other embodiments, a first layer on a second layer can include another layer there between.

Having described certain embodiments, it will now become apparent to one of skill in the art that other embodiments incorporating the concepts of the disclosure may be used. Therefore, the invention should not be limited to the described embodiments, but rather should be limited only by the spirit and scope of the following claims.

Throughout the description, where apparatus and systems are described as having, including, or comprising specific components, or where processes and methods are described as having, including, or comprising specific steps, it is contemplated that, additionally, there are apparatus, and systems of the disclosed technology that consist essentially of, or consist of, the recited components, and that there are processes and methods according to the disclosed technology that consist essentially of, or consist of, the recited processing steps.

It should be understood that the order of steps or order for performing certain action is immaterial so long as the disclosed technology remains operable. Moreover, two or more steps or actions in some circumstances can be conducted simultaneously. The invention has been described in detail with particular reference to certain embodiments thereof, but it will be understood that variations and modifications can be effected within the spirit and scope of the invention.

PARTS LIST 10 hybrid currency banknote/hybrid document
20 banknote/document
22 visible markings
30 inorganic light-emitting diode/light-controlling element
32 light pipe
34 light leak/diffuser
40 controller
42 circuit
44 memory
46 shield
50 power input connection
52 wires
60 power source
62 power component
64 power convertor
66 power connection pads
68 capacitive touch sensor
69 connection post
70 ribbon
80 display
82 red inorganic light-emitting diode
84 green inorganic light-emitting diode
86 blue inorganic light-emitting diode
90 hybrid currency teller machine
91 slot
92 reader
93 writer
94 input device
96 optional teller machine display
98 teller machine controller
100 provide banknote with markings step
110 provide ribbon step
120 provide iLED wafer step
130 provide controller wafer step
140 micro-transfer print iLEDs on ribbon step
150 micro-transfer print controller on ribbon step 160 optional micro-transfer print power source on ribbon step
170 form connections/pads on ribbon step
180 integrate ribbon in banknote step
200 receive banknote step
210 provide power to banknote step
220 view emitted light step
250 insert banknote in teller step
260 read stored value step
270 input value step
280 store new value step
290 return banknote step

What is claimed:

1. A hybrid document, comprising:
a document having visible markings;
one or more light-controlling elements embedded in or on the document;
a controller comprising a circuit having a memory that stores multiple values in memory locations that are ordered in a sequential order, wherein
the memory is a non-volatile read/write memory or a non-volatile write-once memory,
the controller is embedded in or on the document, and
the controller is electrically connected to the one or more light-controlling elements for controlling the one or more light-controlling elements; and
a power input connection electrically connected to any one or all of the controller, the circuit, the memory, or the one or more light-emitting elements,
wherein the memory stores a variable state representing the value of the document and the circuit causes the one or more light-controlling elements to indicate the variable state to a human viewer.

2. The hybrid document of claim 1, wherein the document is a banknote, a bond, a stock certificate, a commercial certificate, a printed value-bearing document, or an identification document.

3. The hybrid document of claim 1, wherein the document memory includes an identifier or serial number.

4. The hybrid document of claim 1, wherein the state is encrypted.

5. The hybrid document of claim 1, wherein the hybrid document is adapted to a hybrid document validation machine that changes the state of the hybrid document from valid to invalid or from invalid to valid.

6. The hybrid document of claim 1, wherein the light-controlling elements are light-emitting elements, light-reflecting elements, inorganic light-emitting diodes, organic light-emitting diodes, micro-electromechanical reflective elements, reflective electrophoretic elements, or reflective electrochromic display elements.

7. The hybrid document of claim 1, comprising a power source connected to the power input connection.

8. The hybrid document of claim 7, wherein the power source is a piezoelectric power source or a photovoltaic power source integrated into the hybrid document.

9. A hybrid document system, the system comprising:
a hybrid document comprising:
a document having visible markings,
one or more light-controlling elements embedded in or on the document,
a controller comprising a circuit having a memory that stores multiple values in memory locations that are ordered in a sequential order, wherein
the memory is a non-volatile read/write memory or a non-volatile write-once memory,
the controller is embedded in or on the document, and
the controller is electrically connected to the one or more light-controlling elements for controlling the one or more light-controlling elements, and
a power input connection electrically connected to any one or all of the controller, the circuit, the memory, or the one or more light-emitting elements,
wherein the memory stores a variable state representing the value of the document and the circuit causes the one or more light-controlling elements to indicate the variable state to a human viewer; and
a power source for electrical connection to the power input connection, wherein the power source is external to the hybrid document and is adapted to electrically connect, inductively couple, or magnetically couple to the hybrid document.

10. A method of using a hybrid document, comprising:
providing a hybrid document and a hybrid document validation machine, wherein the hybrid document comprises
a document having visible markings,
one or more light-controlling elements embedded in or on the document,
a controller comprising a circuit having a memory that stores multiple values in memory locations that are ordered in a sequential order, wherein
the memory is a non-volatile read/write memory or a non-volatile write-once memory,
the controller is embedded in or on the document, and
the controller is electrically connected to the one or more light-controlling elements for controlling the one or more light-controlling elements, and
a power input connection electrically connected to any one or all of the controller, the circuit, the memory, or the one or more light-emitting elements,
wherein the memory stores a variable state representing the value of the document and the circuit causes the one or more light-controlling elements to indicate the variable state to a human viewer, and
the hybrid document validation machine comprises, optionally, a display, and a reader/writer adapted to accept one or more hybrid documents, change the state of the hybrid document, and, optionally, display the state of the hybrid document on the display; and
operating the hybrid document validation machine to set the state of the hybrid document.

11. The method of claim 10, comprising receiving the hybrid document in a state and operating the hybrid document validation machine to change the state of the hybrid document.

12. The method of claim 11, comprising providing the hybrid document in a state, then transporting or storing the hybrid document, and finally operating the hybrid document validation machine to change the state of the hybrid document.

* * * * *